(12) United States Patent
Suh et al.

(10) Patent No.: US 8,753,101 B2
(45) Date of Patent: Jun. 17, 2014

(54) APPARATUS FOR MOLDING A CRASH PAD FOR A VEHICLE

(75) Inventors: Chang Soo Suh, Suwon-Si (KR); Jin Tae Kim, Suwon-Si (KR)

(73) Assignee: Hyundai Motor Company, Seoul (KR)

( * ) Notice: Subject to any disclaimer, the term of this patent is extended or adjusted under 35 U.S.C. 154(b) by 68 days.

(21) Appl. No.: 13/532,416

(22) Filed: Jun. 25, 2012

(65) Prior Publication Data

US 2013/0149410 A1    Jun. 13, 2013

(30) Foreign Application Priority Data

Dec. 12, 2011    (KR) .......................... 10-2011-0133137

(51) Int. Cl.
*B29C 45/14*    (2006.01)

(52) U.S. Cl.
USPC ............ 425/120; 425/121; 425/127; 425/572

(58) Field of Classification Search
USPC .............. 425/120, 121, 123, 124, 127, 129.1, 425/572
See application file for complete search history.

(56) References Cited

U.S. PATENT DOCUMENTS

| 4,935,184 A * | 6/1990 | Sorensen ................... 425/129.1 |
| 6,709,626 B2 * | 3/2004 | Eckardt et al. ................. 264/572 |

FOREIGN PATENT DOCUMENTS

| JP | 2006-35630 A | 2/2006 |
| KR | 10-0337433 B1 | 5/2002 |

\* cited by examiner

*Primary Examiner* — Tim Heitbrink
(74) *Attorney, Agent, or Firm* — Morgan, Lewis & Bockius LLP

(57) ABSTRACT

Provided is an apparatus for molding a crash pad for a vehicle, which includes a first metal mold in which an insert cavity is formed, a second metal mold installed opposite the first metal mold, an insert inserted into the insert cavity and having a through-hole toward the first metal mold so as to define a boundary between an upper part and a lower part of the crash pad that is injection-molded by the first and second metal molds, and a resin introducing unit installed in the first metal mold abutting on the insert and having an elastically adjusted space into which molding resin is introduced through the through-hole when an injection pressure exceeds a predetermined level.

6 Claims, 7 Drawing Sheets

APPARATUS FOR MOLDING A CRASH PAD FOR A VEHICLE

CROSS-REFERENCE TO RELATED APPLICATIONS

The present application claims priority of Korean Patent Application Number 10-2011-0133137 filed Dec. 12, 2011, the entire contents of which application is incorporated herein for all purposes by this reference.

BACKGROUND OF INVENTION

1. Field of Invention

The present invention relates, in general, to an apparatus for molding a crash pad for a vehicle, capable of preventing molding resin from overflowing at a predetermined injection pressure of the molding resin, and increasing a supporting area of an insert to stably support the insert.

2. Description of Related Art

Generally, a crash pad called an instrument panel pad or a dashboard is installed in the front of the interior of a vehicle in which a steering wheel and instruments are located.

This crash pad is an important in-built part installed to provide a variety of pieces of information required for driving and driving convenience, and is manufactured by injection molding of injecting a kind of synthetic resin into an injection mold.

However, the crash pad has recently developed a design tendency to impart a two-tone color for luxurious feeling. A convention method for this two-tone color will be described with reference to FIGS. 1A and 1B.

Such a crash pad 1 is made up of an upper panel 2 and a lower panel 3. The upper and lower panels 2 and 3 are each formed by injection molding. Surfaces of the upper and lower panels 2 and 3 are painted so as to have different colors. The upper and lower panels 2 and 3 are assembled using clips 4 or the like, so that the crash pad 1 having a two-tone color is manufactured.

Meanwhile, as for another related art for manufacturing such a two-tone color crash pad, as shown in FIGS. 2A and 2B, a crash pad 1 is formed integrally by injection molding, one of upper and lower sides is masked, and then the other side is painted, so that a two-tone color crash pad is completed.

However, these related arts are essential to carry out painting, assembling, and masking in order to realize the two-tone color. Thus, these processes require considerable costs and materials, so that the production cost and weight of the crash pad are increased.

For this reason, a method of incorporating the two-tone color into the crash pad without the masking process or the assembling process has been studied. Referring to FIG. 3, an insert 11 is mounted in the cavity of an injection metal mold 10 so as to impart bonding strength while forming a boundary of the two-tone color. Upper and lower fill spaces 12 and 13 are formed on upper and lower portions of the insert 11, and are filled with different color resins for the injection molding.

Here, to support the insert 11 inside the injection metal mold 10, the insert 11 is provided with a groove 11a, and the injection metal mold is provided with a projection 10a on an inner face thereof which faces the groove 11a.

However, in this related art, the insert is not stably mounted and supported in the injection metal mold, and thus a separate fixing device is required to fix the insert.

Further, when an excessive injection pressure is applied to the resin filled in the upper and lower fill spaces, the insert is deformed by the excessive injection pressure as shown in FIG. 4, and thus the molding resin is filled beyond the boundary, which is called an overflow phenomenon.

In contrast, when an insufficient injection pressure is applied to the resin filled in the upper and lower fill spaces, the boundary becomes thin as shown in FIG. 5, so that poor molding is caused by short fill of the resin.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an apparatus for molding a crash pad for a vehicle, capable of preventing molding resin from overflowing into a boundary part in the event of an excessive injection pressure of the molding resin.

Various aspects of the present invention provide for an apparatus for molding a crash pad for a vehicle, capable of increasing a supporting area of an insert installed in an injection metal mold to stably support the insert without a separate device.

Various aspects of the present invention provide for an apparatus for molding a crash pad for a vehicle, which includes a first metal mold in which an inert cavity is formed, a second metal mold installed opposite the first metal mold, an insert inserted into the insert cavity and having a through-hole toward the first metal mold so as to define a boundary between an upper part and a lower part of the crash pad that is injection-molded by the first and second metal molds, and a resin introducing means installed in the first metal mold abutting on the insert and having an elastically adjusted space into which molding resin is introduced through the through-hole when an injection pressure exceeds a predetermined level.

Here, the resin introducing means may include a core hole that is formed in the first metal mold and is spatially interconnected with the through-hole, a core which is air-tightly installed in the core hole, which receives the injection pressure from one end thereof, and which is pushed in the core hole by the pressure of the molding resin introduced through the through-hole when the applied injection pressure exceeds a predetermined level, and a spring that is provided to the other end of the core and that applies an elastic force to the core.

Further, the core may include a flange formed on the other end thereof, and a stepped stopper may be formed at one end of the core hole so as to allow the flange to be caught by the stepped stopper, so that the insert can be placed and supported on one end of the core.

Also, the insert may include a boundary part formed at a portion where the crash pad is divided into the upper and lower parts, a rein introducing part formed on one side of the boundary part and having the through-hole in a middle thereof through which the molding resin passes, and a support part which is formed on the other side of the boundary part, whose longitudinal length is greater than that of the rein introducing part, and which is inserted into the insert cavity.

Here, the boundary part may include a boundary recess in an outer face thereof, and the second metal mold may include a boundary projection so as to be inserted into and placed in the boundary recess. The boundary recess may be formed to such a minimum depth that the boundary projection is able to be inserted.

Further, the support part may include a support projection at one end thereof, and the support projection may be closely supported on an inner face of the insert cavity, so that the molding resin can be injected on one side of the support part.

According to the present invention, when the injection pressure exceeds a predetermined level, the core moves to form a space into which molding resin is introduced. As such, the insert is not deformed, and the molding resin does not overflow. As a result, poor molding of the crash pad is prevented.

Moreover, since a supporting area of the support part formed on the insert is wide, the insert can be more stably supported in the first metal mold, and the insert can be easily placed and supported in the first metal mold.

In addition, since portions of the upper and lower parts which are adjacent to the insert are molded so as to be thick, it is possible to prevent the upper and lower parts from being molded imperfectly although the injection pressure is somewhat insufficient.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1A:
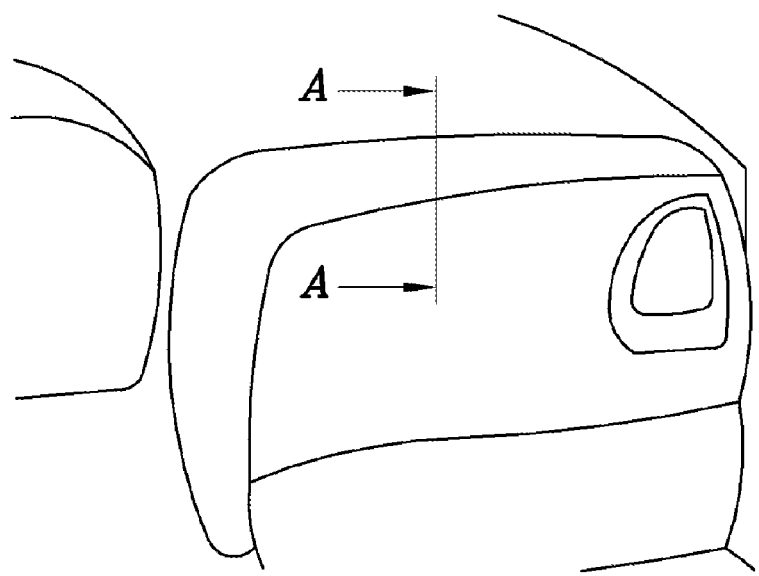
FIGS. 1A and 1B are views for explaining a process of manufacturing an assembled crash pad having a two-tone color according to one related art.
Figure 1B:
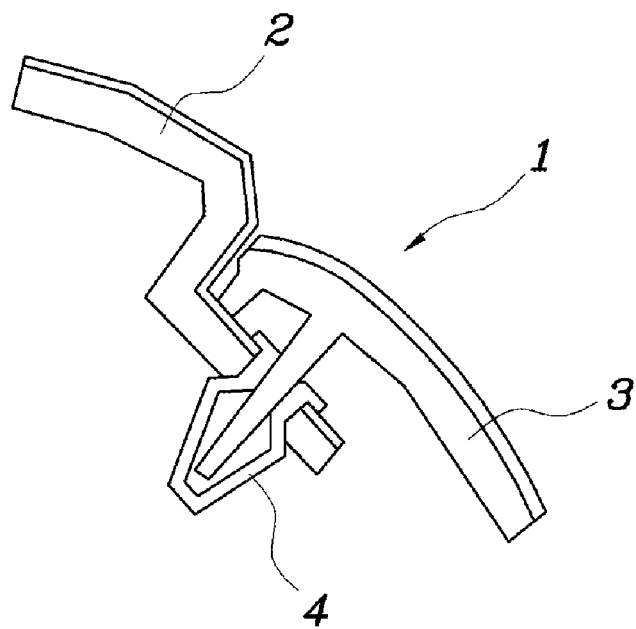
Figure 2A:
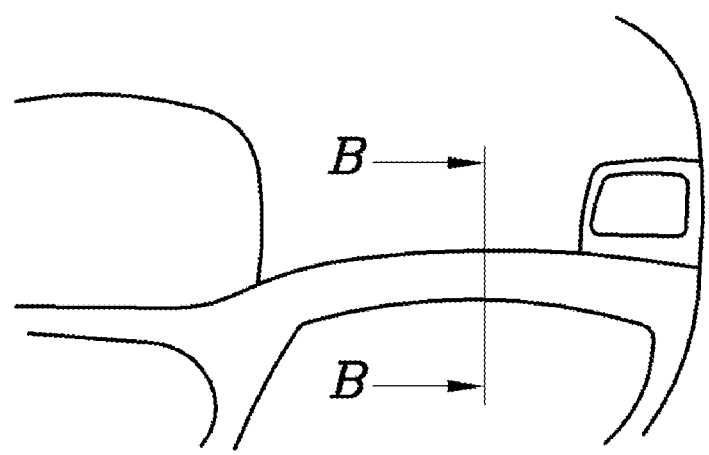
FIGS. 2A and 2B are views for explaining a process of manufacturing an integral crash pad having a two-tone color according to another related art.
Figure 2B:
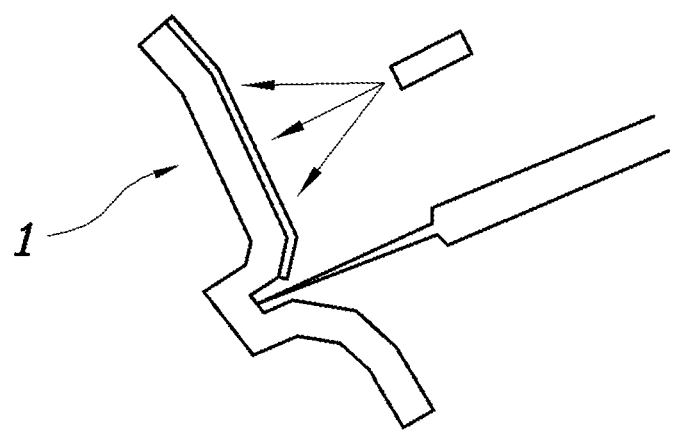
Figure 3:
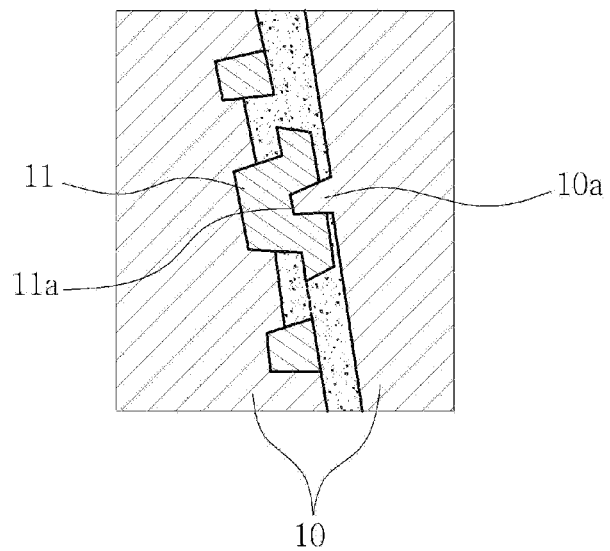
FIG. 3 is a view for explaining a method of molding a crash pad having a two-tone color according to yet another related art.
Figure 4:
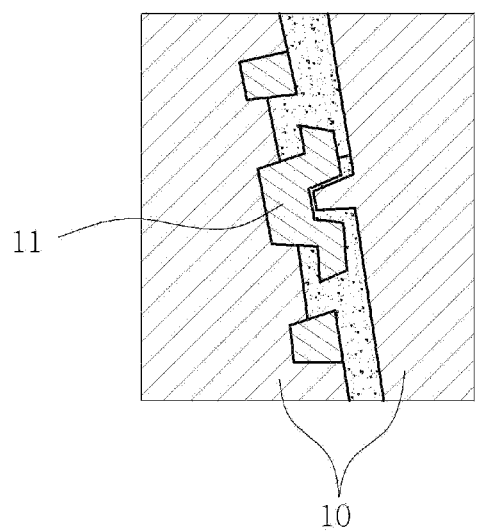
FIGS. 4 and 5 show a state where molding resin is subjected to overflowing or imperfect molding in the crash pad molding process shown in FIG. 3.
Figure 5:
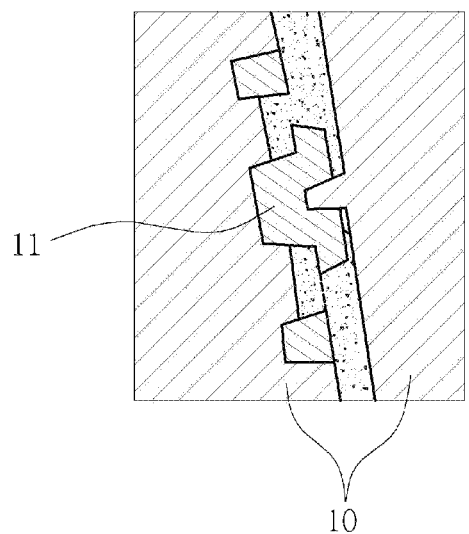
Figure 6:
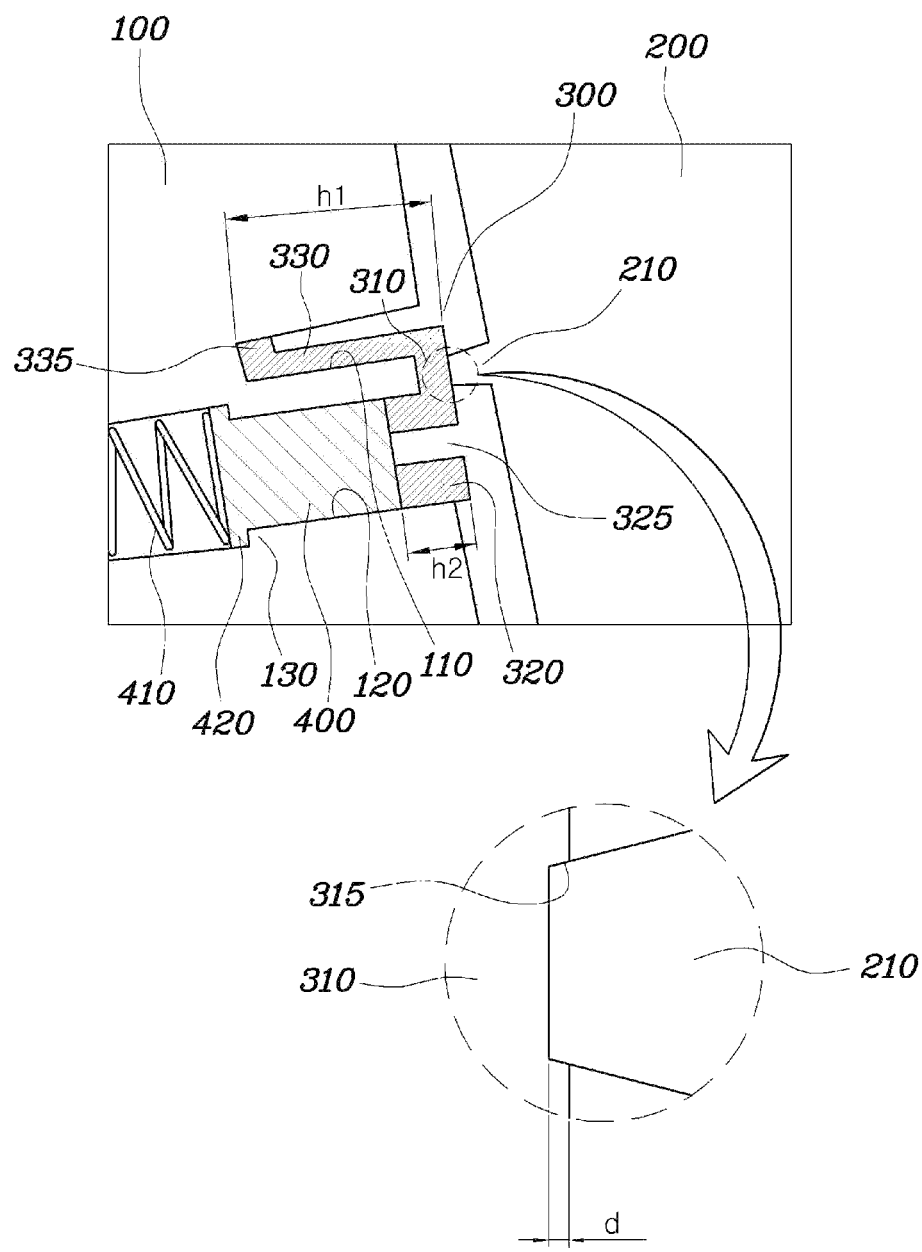
FIG. 6 schematically shows an exemplary apparatus for molding a crash pad according to the present invention.
Figure 7:
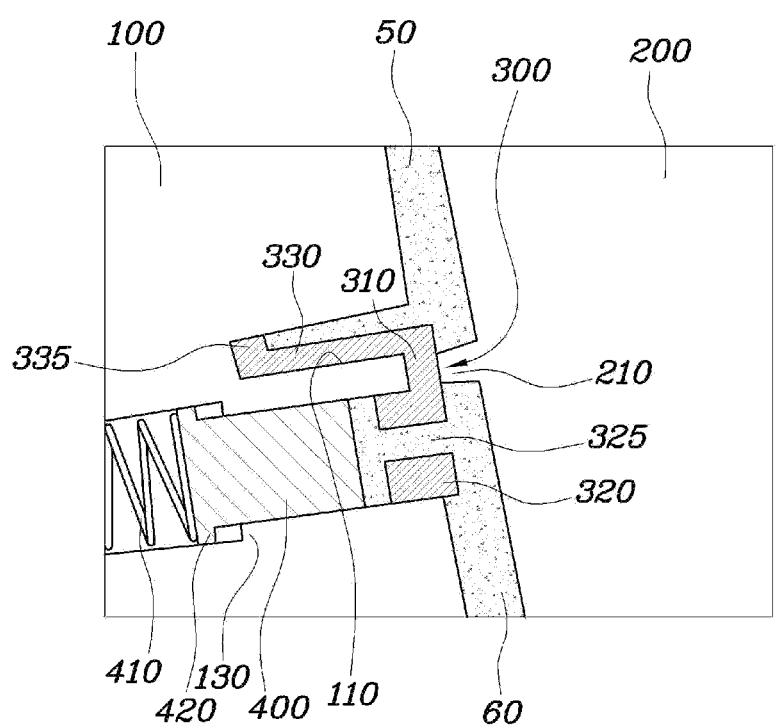
FIG. 7 shows an exemplary state where molding resin is introduced by movement of a core caused by its pressure in the apparatus for molding a crash pad according to the present invention.
Figure 8:
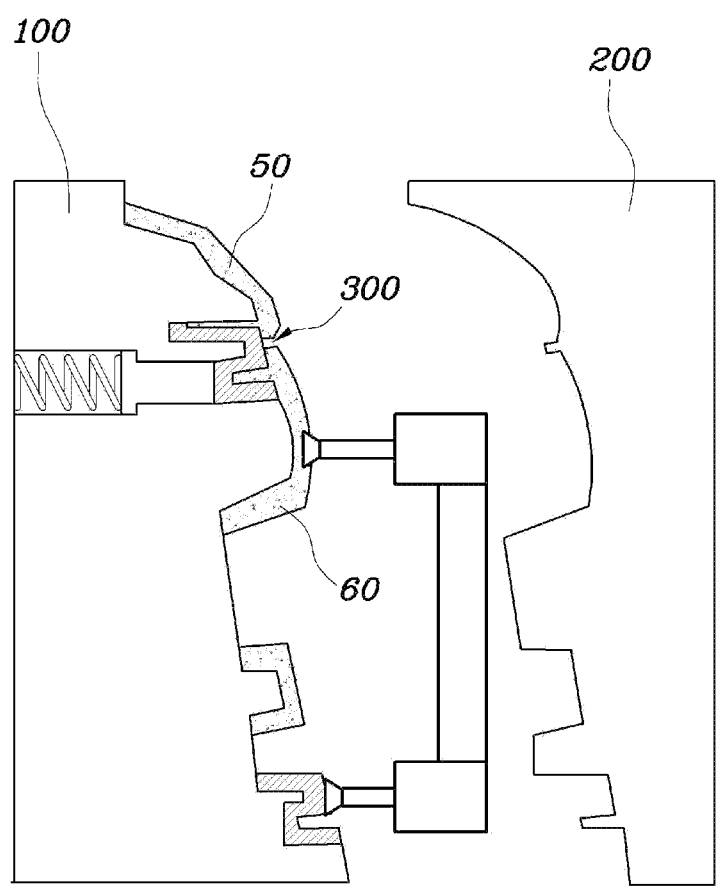
FIG. 8 schematically shows the overall exeplary apparatus for molding a crash pad according to the present invention.

As shown in FIGS. 6 to 8, an apparatus for molding a crash pad for a vehicle includes a first metal mold 100 having an insert cavity 110 formed therein, a second metal mold 200 installed opposite the first metal mold 100, an insert 300 inserted into the insert cavity 110 and having a through-hole 325 toward the first metal mold 100 so as to define a boundary between an upper part 50 and a lower part 60 of a crash pad that is injection-molded by the first and second metal molds 100 and 200, and a resin introducing means installed in the first metal mold 100 abutting on the insert 300 and having an elastically adjusted space into which molding resin can be introduced through the through-hole 325 when an injection pressure exceeds a predetermined level.

The insert 300 is provided between the first metal mold 100 and the second metal mold 200, and serves as a partition between the upper part 50 and the lower part 60. The upper and lower parts 50 and 60 are filled with the molding resins having different colors, so that a crash pad having a two-tone color is molded.

Here, when the injection pressure of the molding resin becomes higher than a predetermined level, the molding resin is pushed toward the first metal mold 100 via the through-hole 325 formed in the insert 300, thereby preventing deformation of the insert 300 and the resultant overflow phenomenon of the molding resin.

The resin introducing means includes a core hole 120 that is formed in the first metal mold 100 and that is spatially interconnected with the through-hole 325, a core 400 which is air-tightly installed in the core hole 120, which receives the injection pressure from one end thereof, and which is pushed in the core hole 120 by the pressure of the molding resin introduced through the through-hole 325 when the applied injection pressure exceeds a predetermined level, and a spring 410 that is provided to the other end of the core 400 and that applies an elastic force to the core 400.

In detail, when the injection pressure of the molding resin injected into the lower part 60 exceeds a predetermined level, the molding resin pushes the core 400 via the through-hole 325, and thus the core 400 moves in the core hole 120 while the spring 410 is being compressed, so that the molding resin is injected into the core hole 120 in which the core 400 moves. Thus, the molding resin is prevented from overflowing due to the excessive pressure of the molding resin, and thus it is possible to prevent poor molding of the crash pad.

Further, the lower part 60 as well as the upper part 50 is molded to a sufficient thickness. Although the injection pressure is insufficient, it is possible to prevent the upper and lower parts 50 and 60 from being molded imperfectly.

One end of the core 400 is placed and supported on one face of the insert 300, so that it is possible to more stably support the insert 300.

In the present invention, the other end of the core 400 is provided with a flange 420. A stepped stopper 130 is formed at one end of the core hole 120 so as to allow the flange 420 to be caught by the stepped stopper 130. As a result, the insert 300 can be placed and supported on one end of the core 400.

That is, in a state where the core 400 is inserted into the core hole 120, the flange 420 formed on the core 400 is caught by the stepped stopper 130, so that the core 400 supports the insert 300 and applies no push force to the insert 300. Thus, the insert 300 can be reliably supported.

In the present invention, the insert 300 includes a boundary part 310 formed at a portion where the crash pad is divided into the upper and lower parts 50 and 60, a rein introducing part 320 formed on one side of the boundary part 310 and having the through-hole 325 in the middle thereof through which the molding resin passes, and a support part 330 which is formed on the other side of the boundary part 310, whose longitudinal length h1 is greater than that h2 of the rein introducing part 320, and which is inserted into the insert cavity 110. In various embodiments the length h1 may be at least twice the length h2.

That is, the support part 330 is deeply inserted into and supported in the first metal mold 100. Thereby, an area where the insert 300 is supported in the first metal mold 100 is further widened. Thus, it is possible to stably support the insert 300 without realizing a separate coupling device.

At this time, the insert cavity 110 into which the support part 330 is inserted must be formed in a shape corresponding to that of the support part 330.

In the present invention, a boundary recess 315 is formed in an outer face of the boundary part 310, and a boundary projection 210 is formed on the second metal mold 200 so as to be inserted into and placed in the boundary recess 315. The boundary recess 315 may be formed to such a minimum depth d that the boundary projection 210 can be inserted.

For example, the depth d of the boundary recess 315 may be about 1 mm, and the boundary projection 210 is inserted into and placed in the boundary recess 315. Thus, the insert 300 is exposed to the outside in the crash pad to a minimum extent, so that the crash pad is allowed to have a luxurious geometry.

In the present invention, the support part 330 is provided with a support projection 335 at one end thereof. The support projection 335 is closely supported on an inner face of the insert cavity 110. The molding resin may be injected on one side of the support part 330.

That is, an end of the support part 330 is inserted into the insert cavity 110, thereby enhancing a supporting force of the insert 300. Further, the upper part 50 is molded on one side of the support part 330, so that the insert 300 and the upper part 50 can be molded with a firm bonding force.

Operation and effects of the present invention will be described in detail with reference to FIGS. 6 and 7.

When molding resins having difference colors are injected through gates formed in the metal mold, the upper part 50 and the lower part 60 are molded in different colors by the insert 300 inserted into the metal mold.

In the initial stage of the injection molding, the injection molding proceeds in a state where the core 400 stably supports the insert 300 due to an elastic force of the spring 410. When an injection pressure is raised above a predetermined level, the molding resin passes through the through-hole 325 to press the core 400.

Then, the spring 410 is compressed because the spring 410 does not withstand the injection pressure of the molding resin, and thus the core 400 moves toward the spring 410. As a result, the molding resin is introduced into the core hole 120 in which the core 400 moves.

Accordingly, even when the injection pressure is excessively applied by the molding resin, a space into which the molding resin is introduced is formed by the movement of the core 400. Thereby, the insert 300 is prevented from being deformed, and thus the molding resin is prevented from overflowing into the boundary part 310. Thus, it is possible to prevent poor molding of the crash pad.

Further, since a supporting area of the support part 330 formed on the insert 300 is very wide, the insert 300 can be stably supported in the first metal mold 100 without a separate device, and a process of placing the insert 300 into the first metal mold 100 can also be simply carried out by a robot.

In addition, since portions of the upper and lower parts 50 and 60 which are adjacent to the insert 300 are molded so as to be thick, it is possible to prevent the upper and lower parts 50 and 60 from being molded imperfectly, although the injection pressure is insufficient. In this way, the cross section of the crash pad is reinforced, and simultaneously head impact deceleration can be maintained below a target value.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for molding a crash pad for a vehicle, comprising:
    a first metal mold including an insert cavity;
    a second metal mold installed opposite the first metal mold;
    an insert inserted into the insert cavity and having a through-hole toward the first metal mold so as to define a boundary between an upper part and a lower part of the crash pad that is injection-molded by the first and second metal molds; and
    a resin introducing means installed in the first metal mold abutting on the insert and having an elastically adjusted space into which molding resin is introduced through the through-hole when an injection pressure exceeds a predetermined level.

2. The apparatus according to claim 1, wherein the resin introducing means includes:
    a core hole that is formed in the first metal mold and is spatially interconnected with the through-hole;
    a core which is air-tightly installed in the core hole, which receives the injection pressure from one end thereof, and which is pushed in the core hole by the pressure of the molding resin introduced through the through-hole when the applied injection pressure exceeds a predetermined level; and
    a spring that is provided on an other end of the core and that applies an elastic force against the core.

3. The apparatus according to claim 1, wherein the core includes a flange formed on the other end thereof, and a stepped stopper is formed at one end of the core hole so as to allow the flange to be caught by the stepped stopper, so that the insert is placed and supported on one end of the core.

4. The apparatus according to claim 1, wherein the insert includes a boundary part formed at a portion where the crash pad is divided into the upper and lower parts, a rein introducing part formed on one side of the boundary part and having the through-hole in a middle thereof through which the molding resin passes, and a support part which is formed on the other side of the boundary part, whose longitudinal length is greater than that of the rein introducing part, and which is inserted into the insert cavity.

5. The apparatus according to claim 4, wherein the boundary part includes a boundary recess in an outer face thereof, the second metal mold includes a boundary projection so as to be inserted into and placed in the boundary recess, and the boundary recess is formed to such a minimum depth that the boundary projection is able to be inserted.

6. The apparatus according to claim 4, wherein the support part includes a support projection at one end thereof, and the support projection is closely supported on an inner face of the insert cavity, so that the molding resin is injected on one side of the support part.

* * * * *